United States Patent [19]

Katsumata et al.

[11] Patent Number: 5,382,877
[45] Date of Patent: Jan. 17, 1995

[54] VEHICLE HEADLAMP CONTROL SYSTEM

[75] Inventors: Shuichi Katsumata; Akira Kawabata; Hironori Matsumoto, all of Shizuoka, Japan

[73] Assignee: Yazaki Corporation, Tokyo, Japan

[21] Appl. No.: 31,473

[22] Filed: Mar. 15, 1993

[30] Foreign Application Priority Data

Mar. 19, 1992 [JP] Japan .................. 4-063574

[51] Int. Cl.⁶ ............................... B60Q 1/02
[52] U.S. Cl. ........................ 315/82; 315/83; 315/291
[58] Field of Search ................ 315/82, 83, 291

[56] References Cited

U.S. PATENT DOCUMENTS

| | | | |
|---|---|---|---|
| 3,040,207 | 6/1962 | Grontkowski | 315/82 |
| 3,769,519 | 10/1973 | Adamian | 315/83 |
| 4,841,198 | 6/1989 | Wilhelm | 315/82 |
| 5,030,884 | 7/1991 | Roussey et al. | 315/83 |
| 5,081,565 | 1/1992 | Nabha et al. | 315/82 |
| 5,113,120 | 5/1992 | Scott et al. | 315/291 |

FOREIGN PATENT DOCUMENTS 2705320 4/1985 Germany .
3532339 10/1991 Germany .

*Primary Examiner*—Richard A. Bertsch
*Assistant Examiner*—Roland G. McAndrews, Jr.
*Attorney, Agent, or Firm*—Sughrue, Mion, Zinn, Macpeak & Seas

[57] ABSTRACT

Disclosure is a vehicle headlamp control system having a control circuit which can control the operation and the intensity of illumination of headlamps with ease. The vehicle headlamp control system has a control circuit for controlling the operations of headlamps on a vehicle at the start of the engine. The control circuit operates to adjust the duty ratios of driving pulse currents applied to the headlamps through transistors, thereby to adjust the intensities of illumination of the headlamps. The control circuit has elements for adjusting the duty ratios. With the system, the intensities of illumination of the headlamps can be adjusted with ease.

6 Claims, 6 Drawing Sheets

VEHICLE HEADLAMP CONTROL SYSTEM

BACKGROUND OF THE INVENTION

This invention relates to a vehicle headlamp control system having a control circuit which is able to control the intensities of illumination of headlamps which are suitable for vehicles traveling in countries such as those in Northern Europe or Canada where there are white nights, or in countries where it is often misty.

In countries high in altitude such as those in the Northern Europe and Canada, there is a white night season in which it is dim. In England, it is frequently foggy, and sometimes it is required to turn on vehicle headlamps even in daytime. In those countries, it is necessary to turn on vehicle headlamps for traffic safety even in daytime, and it is obliged by law to do so.

In compliance with the law, in addition to the headlamps, auxiliary headlamps lower in illuminance than them are mounted on the vehicle, or a control system is provided for the headlamps. The control system, as described below in detail, has a current limiting resistor for limiting the currents applied to the headlamps thereby limiting the intensities of illumination of the latter.

FIG. 7 is a circuit diagram showing an example of a conventional vehicle headlamp control system.

In FIG. 7, reference characters $1_R$ and $1_L$ designate right and left headlamps; 2, an alternator; 3, a parking brake switch; 4, a current limiting resistor; 5, a dimmer passing switch; 6, a headlamp switch; 7, a battery; and 8 through 12, relays.

In the control system, the limiting resistor 4 limits the currents supplied to the headlamps $1_R$ and $1_L$ thereby lowering the intensities of illumination of the latter.

The control system operates as follows:

When the vehicle is parked, the alternator 2 produces no charge signal (i.e., an engine start signal), and therefore no current is applied to the exciting coils $11_1$, $12_1$ and $9_1$ of the relays 11, 12 and 9, and the headlamps $1_R$ and $1_L$ are kept turned off.

When the engine starts; that is, when the alternator 2 rotates to produce the charge signal, current is supplied to the exciting coils $11_1$ and $12_1$ of the relays 11 and 12, so that the relays 11 and 12 are activated. As a result, the contact means $12_a$ of the relay 12 is opened, while the contact means $12_b$ is closed, so that the battery 7 is connected through the contact means $12_b$ to the headlamps $1_R$ and $1_L$. At the same time, the contact means of the relay 11 is connected through a contact $11_b$ to the current limiting resistor 4, so that the low beam elements $L_o$ of the headlamps $1_R$ and $1_L$ are grounded through the limiting resistor 4; that is, the intensities illumination of the headlamps $1_R$ and $1_L$ are decreased.

When the headlamp switch 6 is turned on, current is applied to the exciting coil $9_1$ of the relay 9, so that its contact means $9_a$ is opened to interrupt the application of current to the relays 11 and 12. At the same time, the contact means $9_b$ of the relay 9 is closed, so that the battery 7 is electrically connected through the contact means $8_a$ of the relay 8 to first terminals of the low beam elements $L_o$ of the headlamps $1_R$ and $1_L$, the remaining second terminals of which are grounded through the contact means $11_a$ of the relay 11 and through a contact $5_a$ of first contact means of the dimmer passing switch 5, as a result of which the low beam elements of the headlamps $1_R$ and $1_L$ are turned on. On the other hand, when the passing switch 5 is operated, the armature of the first contact means is tripped over to the contact $5_b$ from the contact $5_a$, so that the high beam elements $H_i$ of the headlamps $1_R$ and $1_L$ are turned on.

When the parking brake switch 3 is turned on, the relay 10 is activated; that is, the armature of its contact means is tripped over to a contact $10_b$, so that the contact means of the relays 11, 12 and 9 are restored (placed in the initial states); that is, the headlamps $1_R$ and $1_L$ are turned off.

In the conventional vehicle headlamp control system, sequential control is performed by using the relays, to control the operations of the headlamps $1_R$ and $1_L$. In order to control the headlamps $1_R$ and $1_L$ accurately, it is necessary to provide a control circuit intricate in arrangement. On the other hand, controlling the illuminance is achieved by using the current limiting resistor; that is, the current limiting resistor adjusts the current flowing to the headlamps $1_R$ and $1_L$ thereby to adjust the intensities of illumination of the latter. In the above-described relay-operated sequential control, it is considerably difficult to supply pulse currents through the relays, and it is impossible to adjust the duty ratios of the pulse currents applied to the headlamps $1_R$ and $1_L$.

Furthermore, different countries employ different headlamp specifications, and different headlamps have different requirements in design. Hence, the aforementioned relay-operated sequential control by the control circuit in the vehicle headlamp control system is not sufficient for timing control. The intensities of illumination of the headlamps may be adjusted by changing the resistance of the current limiting resistor. However, in this case, it is necessary to select the resistance so as to obtain the aimed intensities illumination. This selection is rather troublesome. Thus, the conventional relay-operated sequential control system cannot sufficiently deal with various controls for the headlamps.

SUMMARY OF THE INVENTION

In view of the foregoing, an object of this invention is to provide a vehicle headlamp control system having control circuit which can control the operation and the intensity of illumination of headlamps with ease.

A vehicle headlamp control system according to the invention comprises: a control circuit for controlling the operations of headlamps on a vehicle at the start of the engine; control means for adjusting the duty ratios of driving pulse currents with the aid of the control circuit which are supplied to the headlamps, thereby to adjust the intensities of illumination of the headlamps; means for maximizing the duty ratios of the driving pulse currents in response to a turn-on signal from a dimmer passing switch or a headlamp switch, thereby to maximize the intensities of illumination of the headlamps; and means for suspending the application of the currents to the headlamps in response to a turn-on signal from a parking brake switch.

The system further comprises: a select switch or terminals which are used to change the duty ratios of the driving pulse currents to predetermined values according to the intensities of illumination of the headlamps.

The vehicle headlamp control system of the invention has the control circuit which controls the operations of the headlamps at the start of the engine. The control circuit operates to adjust the duty ratios of driving pulse currents supplied to the headlamps, thereby to adjust the intensities of illumination of the headlamps. In response to the signal from the dimmer passing switch or the headlamp switch, the duty ratios of the driving pulse currents are maximized whereby the intensities of illumination of the headlamps are maximized. Hence, in the case where the vehicle headlamp control system is installed on a vehicle, it is unnecessary for the vehicle to have auxiliary headlamps, and the intensities of the headlamps can be readily adjusted by controlling the driving pulse currents applied thereto.

BRIEF DESCRIPTION OF THE DRAWINGS

FIG. 6 is a diagram for a description of the operations of a select switch; and

DETAILED DESCRIPTION OF THE PREFERRED EMBODIMENTS

Figure 1:
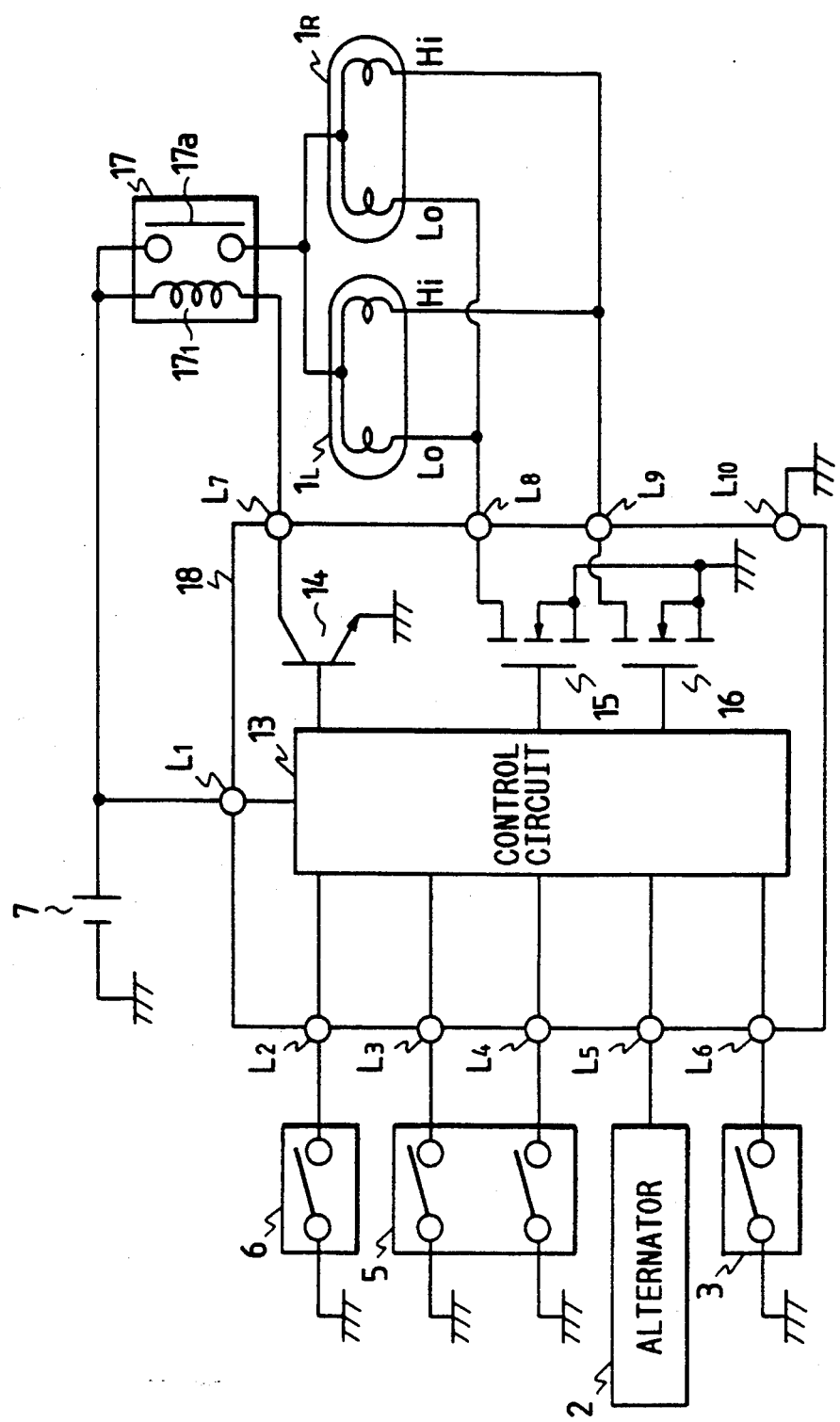
FIG. 1 is a circuit diagram, partly as a block diagram, showing the arrangement of a first example of a vehicle headlamp control system according to this invention.

FIG. 1 is a circuit diagram showing a first example of a vehicle headlamp control system according to this invention. In FIG. 1, reference characters $1_R$ and $1_L$ designate right and left headlamps, respectively; 2, an alternator; 3, a parking brake switch; 5, a dimmer passing switch; 6, a headlamp switch; 7, a battery; 17, a relay; and 18, a vehicle headlamp control unit comprising a control circuit 13, a transistor 14, and field-effect transistors 15 and 16 (hereinafter referred to "FETs 15 and 16", when applicable).

The battery 7 is connected through a terminal $L_1$ to the control circuit 13 and connected to the exciting coil $17_1$ of the relay 17 and to one terminal of the contact means $17a$ of the latter 17, the other terminal of which is connected to the headlamps $1_R$ and $1_L$. The headlamp switch 6 is connected through a terminal $L_2$ to the control circuit 13. The dimmer passing switch has two contact means, which are connected through terminals $L_3$ and $L_4$ to the control circuit 13. The alternator 2 and the parking brake switch 3 are connected respectively through terminals $L_5$ and $L_6$ to the control circuit 13.

The base of the transistor 14 and the gates of the FETs 15 and 16 are connected to the control circuit 13. The collector of the transistor 14 is connected through a terminal $L_7$ to the exciting coil $17_1$ of the relay 17. The drains of the FETs 15 and 16 are connected through terminals $L_8$ and $L_9$ to the low and high beam elements $L_o$ and $H_i$ of the headlamps $1_R$ and $1_L$, respectively.

The operation of the vehicle headlamp control system according to the invention will be described with reference to a flow chart of FIG. 2, which shows the operations of the headlamps which are performed while the vehicle is traveling in a white night season.

Figure 2:
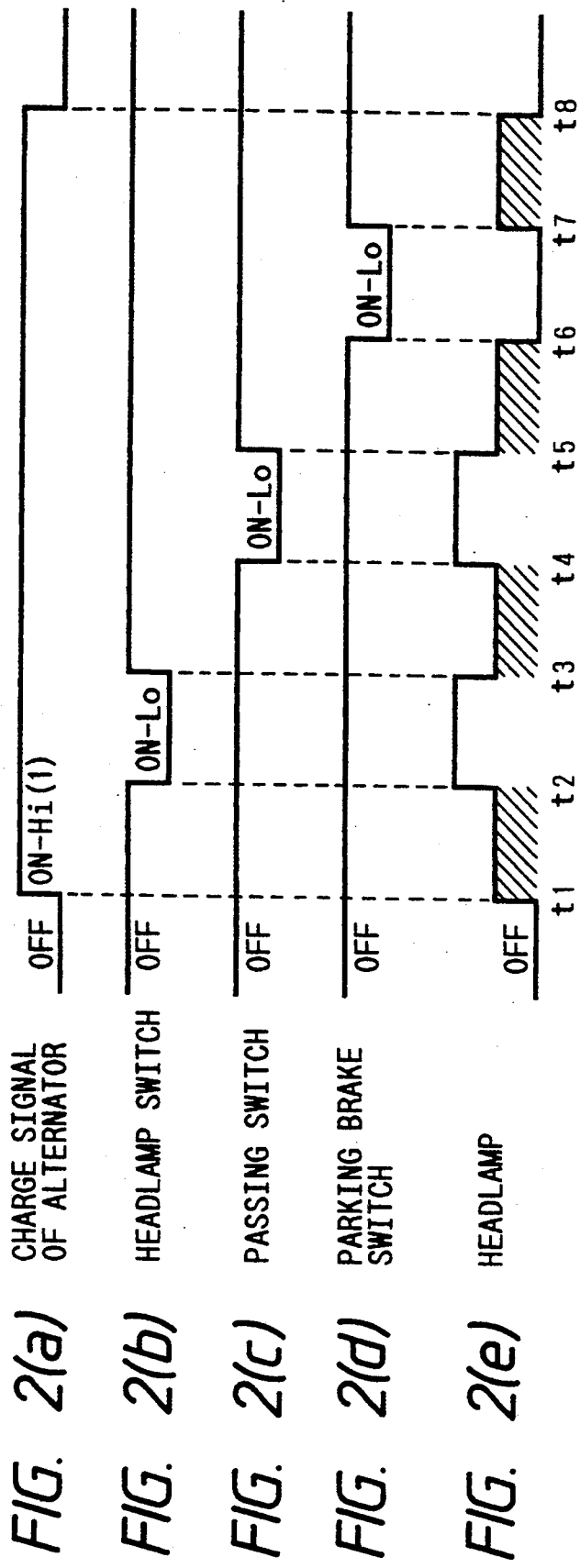
FIG. 2 is a time chart for a description of the operation of the vehicle headlamp control system shown in FIG. 1.

As shown in the part (a) of FIG. 2, at the time instant $t_1$, the alternator 2 applies a charge signal (i.e., an engine operating signal) through the terminal $L_5$ to the control circuit 13. In this case, as shown in the part (b) of FIG. 2, the headlamp switch 6 is held turned off, while as shown in the part (e) of FIG. 2 the headlamps $1_R$ and $1_L$ are turned on; however, the intensities of illumination of the headlamps $1_R$ and $1_L$ are at a low level.

When, as shown in the part (b) of FIG. 2, the headlamp switch 6 is turned on at the time instant $t_2$, the intensities of illumination of the headlamps $1_R$ and $1_L$ is maximized. When the headlamp switch 6 is turned off at the time instant $t_3$, the intensities of illumination are returned to the low level. When, as shown in the part (c) of FIG. 2, the passing switch 5 is held turned on between the time instants $t_4$ and $t_5$, the intensities of illumination of the headlamps $1_R$ and $1_L$ are at the maximum level.

On the other hand, in the case when, as shown in the part (d) of FIG. 2, the parking brake switch 3 is held turned on between the time instants $t_6$ and $t_7$, the transistor 14 is rendered non-conductive (off), so that the contact means of the relay 17 is opened, and the headlamps $1_R$ and $1_L$ are therefore turned off.

Figure 3:
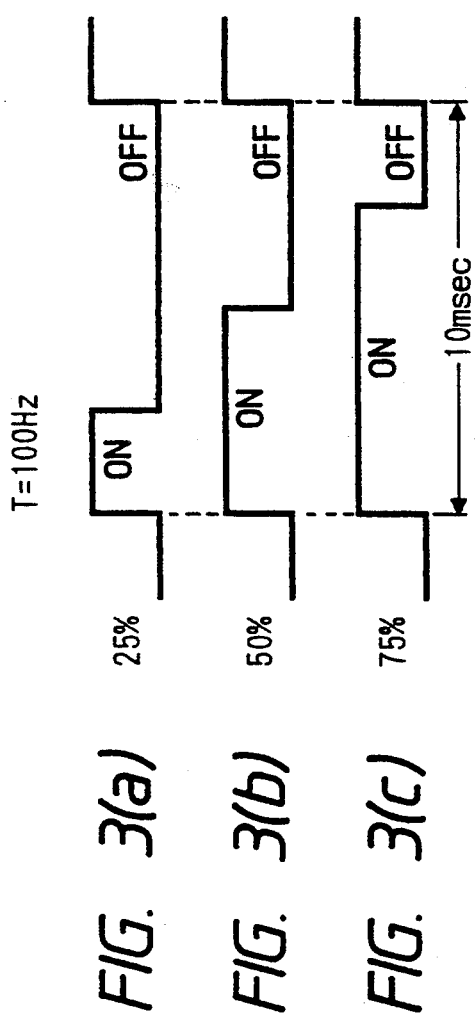
FIG. 3 is a diagram showing duty ratios of a driving pulse current applied to a headlamp.

A pulse current of 100 kHz is applied to the headlamps $1_R$ and $1_L$, and the intensities of illumination of the latter can be adjusted by changing the duty ratios of driving pulse currents supplied to the gates of the FETs 15 and 16. FIG. 3 shows the duty ratios of the currents supplied to the headlamps $1_R$ and $1_L$. More specifically, the parts (a), (b) and (c) of FIG. 3 show duty ratios of 25%, 50% and 75%, respectively. As is apparent from FIG. 3, in the case of the duty ratio of 50%, the illuminance is higher than in the case of the duty ratio of 25%. The duty ratios of the currents applied to the headlamps $1_R$ and $1_L$ can be adjusted as follows: A frequency division counter is provided in the control circuit 13, and a signal is externally applied to the control circuit, to adjust the duty ratios of the currents.

It is capable that a variety of conventional logic circuits may be employed for the control circuit 13. Furthermore, in the above-described system, the frequency division counter is employed for adjustment of the duty ratios; however, the invention is not limited thereto or thereby; that is, needless to say, a variety of conventional circuits may be employed for adjustment of the duty ratios.

In the above-described system, the maximum luminance is obtained by making the duty ratio maximum. However, the same effect may be obtained by the following method: Relays (not shown) are connected in parallel to the FETs 15 and 16. The relays are turned on to decrease the source-drain voltage drops of the FETs 15 and 16, thereby to increase the illuminance to the maximum level.

Figure 4:
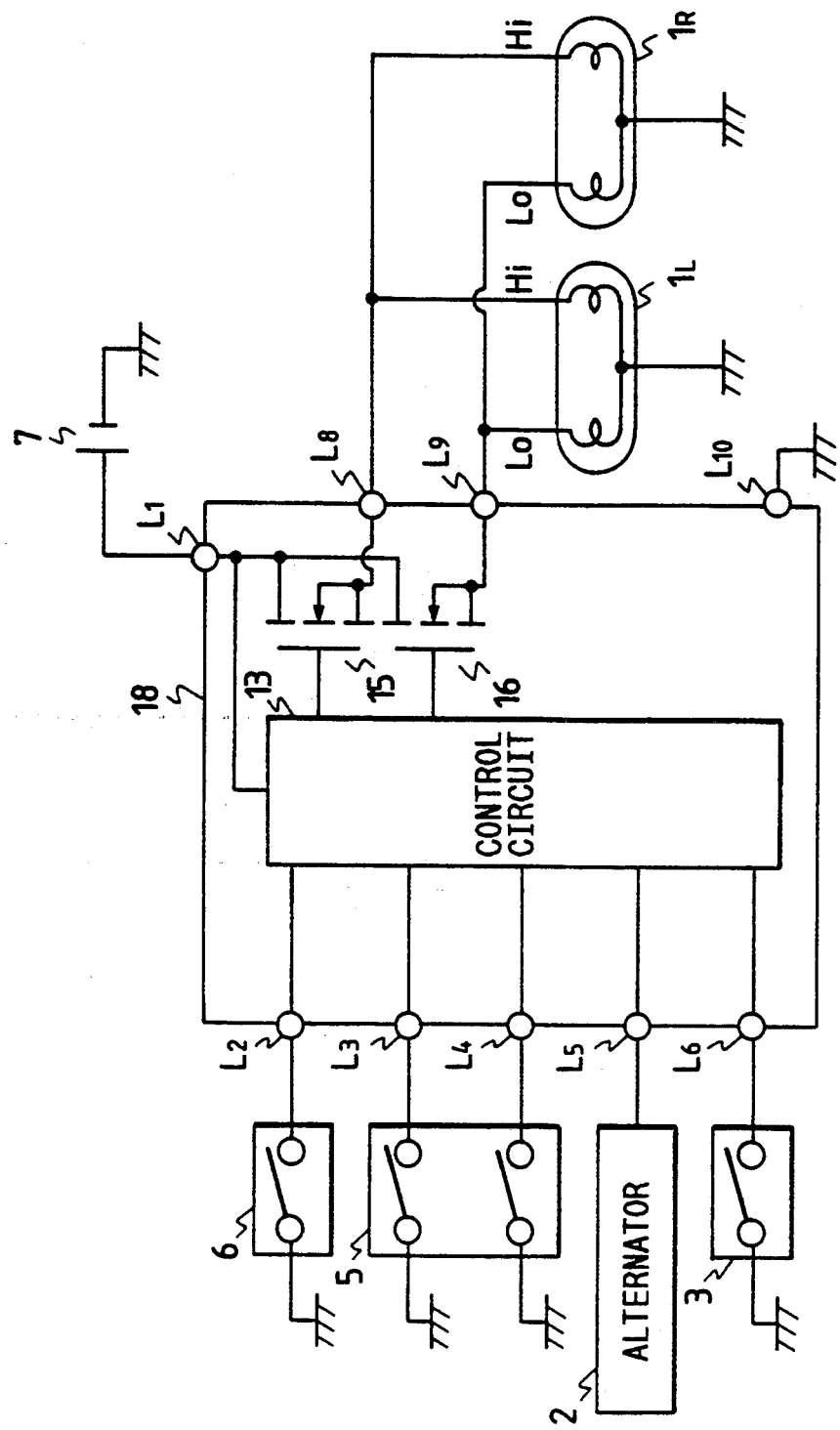
FIG. 4 is a circuit diagram, partly as a block diagram, showing the arrangement of a second example of the vehicle headlamp control system according to the invention.

FIG. 4 shows a second example of the vehicle headlamp control system according to the invention. In FIG. 4, parts corresponding functionally to those which have been described with reference to FIG. 1 are therefore designated by the same reference numerals or characters.

In the control system shown in FIG. 4, the transistor 14 and the relay 17 shown in FIG. 1 are not employed, and the FETs 15 and 16 serve as drive circuits for the headlamps $1_R$ and $1_L$. The drains of the FETs 15 and 16 are connected to the terminal $L_1$, and the sources thereof are connected through the terminals $L_8$ and $L_9$ to the high beam elements $H_i$ and the low beam elements $L_o$ of the headlamps $1_R$ and $1_L$, respectively.

The control circuit 13 applies a pulse having a predetermined duty ratio to the gates of the FETs 15 and 16, so that the latter 15 and 16 supply driving pulse currents to the headlamps $1_R$ and $1_L$. As a result, the headlamps $1_R$ and $1_L$, are lighted with the intensities of illumination corresponding to the duty ratios.

Figure 5:
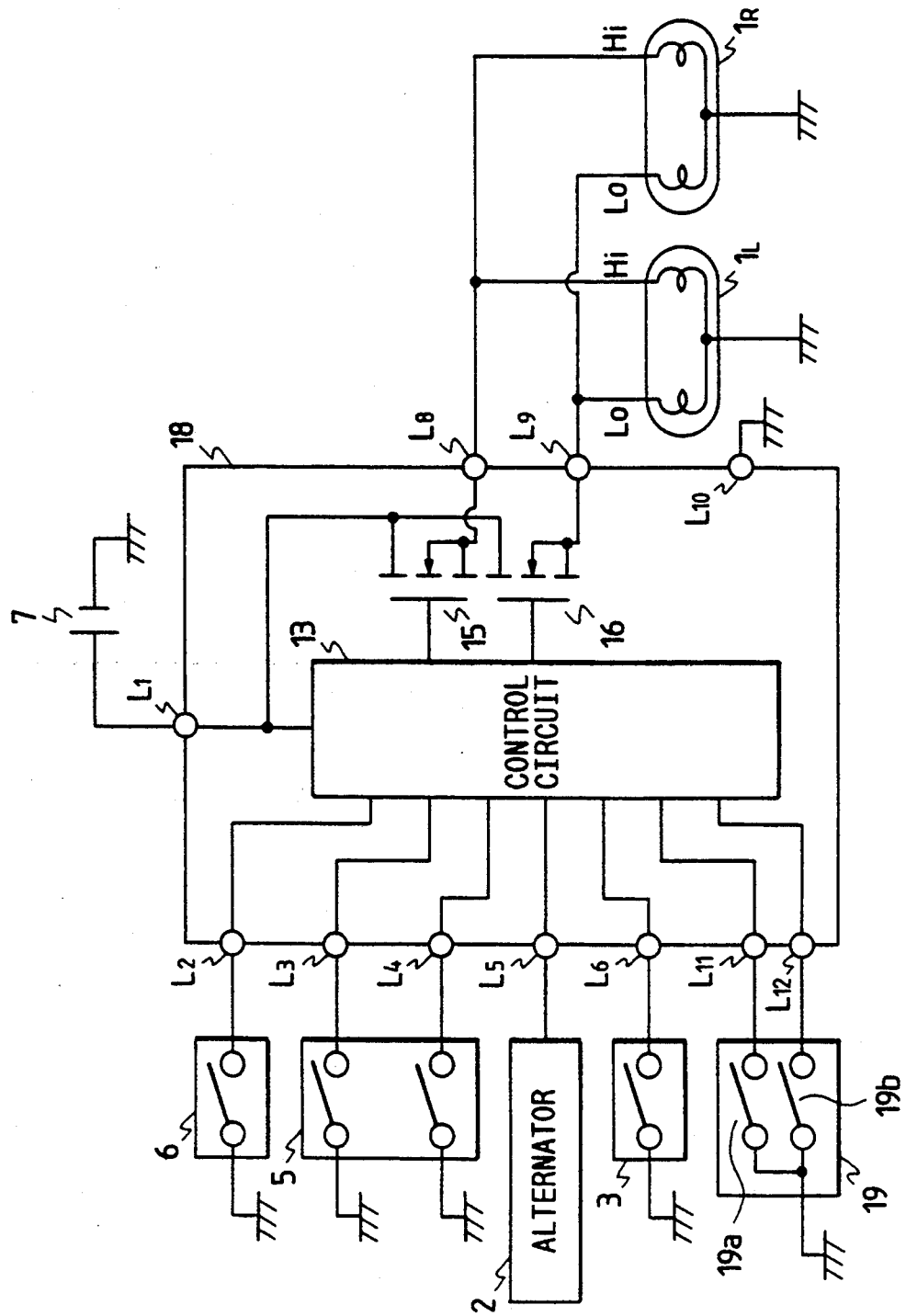
FIG. 5 is a circuit diagram, partly as a block diagram, showing the arrangement of a third example of the vehicle headlamp control system according to the invention.
Figure 7:
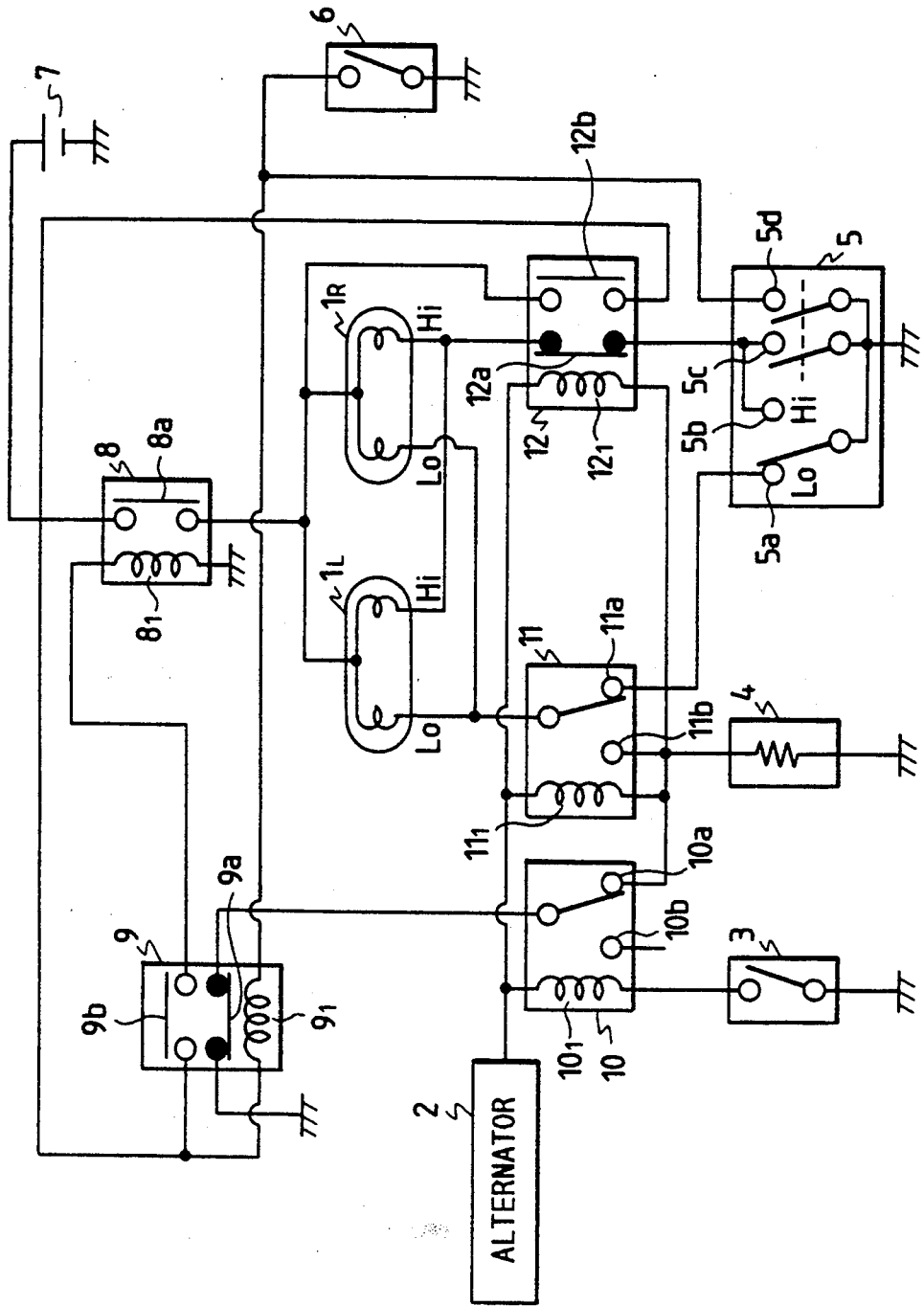
FIG. 7 is a circuit diagram, partly as a block diagram, showing the arrangement of a conventional vehicle headlamp control system.

FIG. 5 shows a third example of the vehicle headlamp control system according to the invention. The third example is obtained by adding a select switch 19 to the second example shown in FIG. 4. Selecting means for setting the select switch 19 to three logical values as shown in FIG. 6 is employed, so that the system satisfies the laws or requirements in a number of countries.

For instance when the switch units 19a and 19b of the select switch 19 are turned off, the high beam elements $H_i$ of the headlamps $1_R$ and $1_L$ provide a 25% illuminance which corresponds to the law in Canada. When the switch unit 19a is turned on while the switch unit 19b is turned off, the low beam elements provide a 34% illuminance, which corresponds to the law in England. When the switch unit 19a is turned off while the switch unit 19b is turned on, the low beam elements provide an 84% illuminance, which corresponds to the law in Norway. Those values correspond to the duty ratios of the pulse currents applied to the headlamps $1_R$ and $1_L$. Thus, the illuminance can be changed by adjusting the duty ratio with the switch 19.

In the system shown in FIG. 5, the select switch 19 of the electronic control unit 18 is operated to change the duty ratios so that the quantities of light of the headlamps are decreased to values determined by the laws of a plurality of countries. Furthermore, as for the intensities of illumination of the headlamps, it is capable that the duty ratios can be set to desired values by suitably programming the frequency division counter in the control circuit. Thus, different requirements in different countries can be satisfied according to the invention.

In the above-described system, the select switch 19 may be eliminated, and instead, means for grounding the terminals $L_{11}$ and $L_{12}$ with a wire harness may be employed for controlling the intensities of illumination of the headlamps.

As was described above, in the vehicle headlamp control system, the control circuit operates to cause the frequency division counter to adjust the duty ratios of the driving pulse currents supplied to the headlamps. Thus, the system is advantageous in that the intensities of illumination of headlamps can be readily adjusted by changing the duty ratios of the driving pulse currents applied to the headlamps; that is, the system can deal with different headlamp specifications in different countries. Hence, according to the invention, it is unnecessary to manufacture different vehicle headlamp control systems for different laws in different countries or different kinds of vehicle; that is, the system of the invention can used under such different laws and for such different kinds of vehicle.

Furthermore, the control circuit comprising the arithmetic circuit and the logic circuit has the means for increasing the intensities of illumination of the headlamp maximum when the headlamp switch or the dimmer passing switch is turned on, and the means for interrupting the application of currents to the headlamps when the parking brake switch is turned on, so that the headlamps can be controlled in various manners.

The vehicle headlamp control system of the invention is able to adjust the illuminance of the headlamps. Therefore, it is unnecessary for the vehicle with the system of the invention to have auxiliary headlamps.

What is claimed is:

1. A vehicle headlamp control device for controlling operation of a headlamp on a vehicle, said control device comprising:
    a control circuit for controlling an intensity of illumination of said vehicle headlamp by applying a driving pulse current to said headlamp through a transistor, said control circuit including:
    a frequency division counter for adjusting a duty ratio of said driving pulse current in response to a control signal to change said intensity of illumination of said head lamp.

2. A vehicle headlamp control device as claimed in claim 1, wherein said control circuit maximizes said duty ratio of said driving pulse current to maximize said intensity illumination of said headlamp in response to said control signal provided by at least one of a dimmer passing switch and a headlamp switch.

3. A vehicle headlamp control device as claimed in claim 1, further comprising a selecting switch for providing said control signal to set said duty ratio to a predetermined value.

4. A vehicle headlamp control device as claimed in claim 1, further comprising terminals for setting said duty ratio to a predetermined value by grounding at least one of said terminals with a wire harness.

5. A vehicle headlamp control device as claimed in claim 1, wherein said control circuit interrupts an application of said driving pulse current in response to an output signal of a parking brake switch.

6. A vehicle headlamp control device as claimed in claim 1, wherein said control circuit turns on said headlamp at a start of an engine thereof.

* * * * *